No. 762,006. PATENTED JUNE 7, 1904.
T. F. SMITHSON.
GARDEN AND TRUCK CULTIVATOR.
APPLICATION FILED NOV. 12, 1903.
NO MODEL.
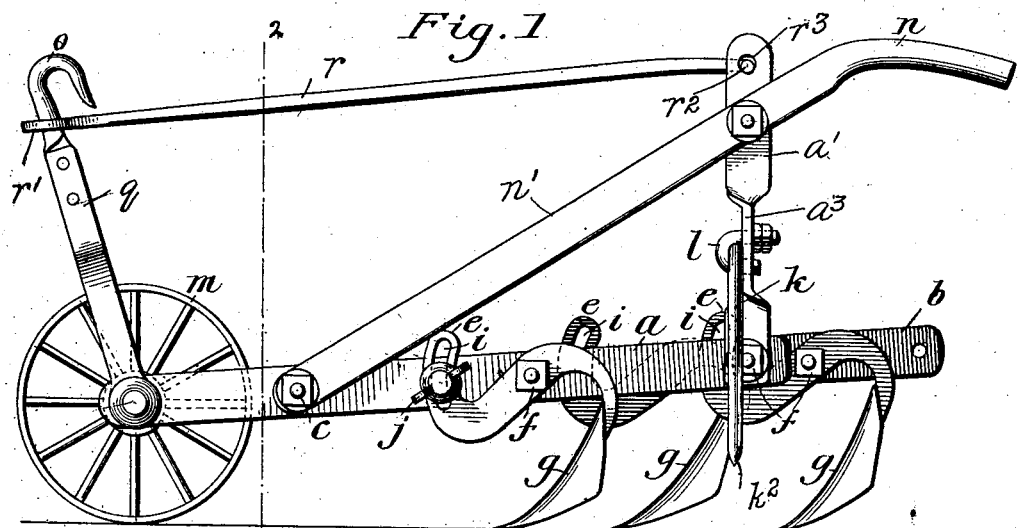
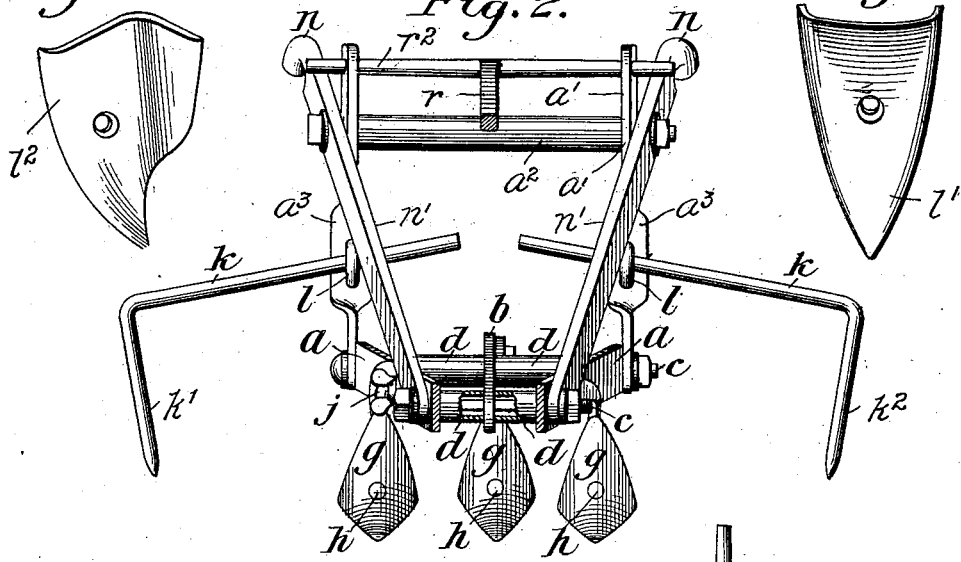
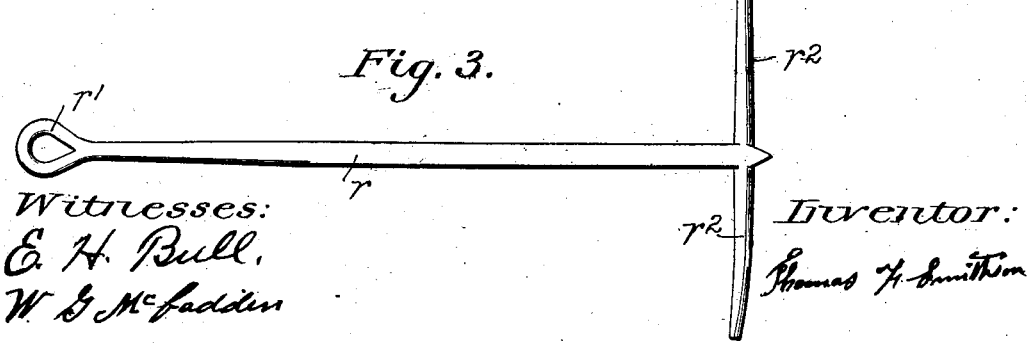
Witnesses:
E. H. Bull.
W. G. McFadden
Inventor:
Thomas F. Smithson No. 762,006. Patented June 7, 1904.

UNITED STATES PATENT OFFICE.

THOMAS F. SMITHSON, OF WHITEFORD, MARYLAND, ASSIGNOR OF ONE-HALF TO THOMAS L. PYLE, OF PYLESVILLE, MARYLAND.

GARDEN AND TRUCK CULTIVATOR.

SPECIFICATION forming part of Letters Patent No. 762,006, dated June 7, 1904.

Application filed November 12, 1903. Serial No. 180,845. (No model.)

*To all whom it may concern:*

Be it known that I, THOMAS F. SMITHSON, a citizen of the United States, residing at Whiteford, in the county of Harford and State of Maryland, have invented a new and useful Garden and Truck Cultivator, of which the following is a specification.

This invention relates to improvements in a garden and truck implement, and has for its object to construct a machine of this character which may be manipulated to suit the particular class of work to be done and which may readily be converted into a marker, hiller, plow, or cultivator, as desired.

The invention is illustrated in the accompanying drawings, in which—

Figure 1 illustrates a side elevation of the machine. Fig. 2 illustrates a front vertical section on the line 2 2 of Fig. 1, a portion of the retaining-sleeve being broken away. Fig. 3 is a detail view of the brace-bar; Fig. 4, a detail of a share-blade, and Fig. 5 a detail of a marker-tooth.

In the drawings, $a$ designates the two longitudinal side bars, which diverge as they extend from the front toward the rear, but have a position in the same horizontal plane. A bar $b$ extends from the front to the rear of the machine and projects beyond the said side bars, and said bar has a central position between said side bars. Bolts $c$ extend through the bars $a$ and $b$ at each end and secure the same rigidly together. Sleeves $d$ surround each of the bolts $c$ on opposite sides of the center bar $b$, and said sleeves serve to hold said bar in its central position on the bolts between said side bars. Two brace-bars $a'$ extend vertically from the rear ends of the side bars $a$ and are connected near their upper ends by a horizontal rod $a^2$.

A handle-bar $n'$ is connected at its lower end to the bolt $c$ and extends toward the rear in an upwardly-inclined direction and at its higher end is supported on the ends of the horizontal rod $a^2$. The extreme ends of these bars $n'$ are curved downwardly and form handles $n$ for the operator to grasp.

A substantially S-shaped standard or tooth-iron $e$ is pivotally bolted at $f$ to each of the side and center bars, and these standards are each designed to carry a suitable tooth or blade $g$ at their downwardly-projecting ends, while the upwardly-projecting ends of said standards are each provided with a slot $i$, through which a thumb-screw $j$ projects and by means of which the standards may be adjusted, so that the teeth or blades may be raised or lowered, as desired. These teeth or blades are preferably secured to the standards by bolts $h$ in order that they may readily be removed and the properly-shaped tooth or blade attached to suit the work to be done.

The vertical brace-bars $a'$ are each provided with a flat face $a^3$, through each of which a suitable hook-bolt $l$ extends, and these hook-bolts each support an L-shaped gage-arm $k$, the downwardly-projecting arms $k'$ of which are designed to be lowered, so as to drag along the earth and mark off a line at one side of the machine. The gage-arm at one side will trace the line previously made, while the arm at the other side will lay off a new line which will be parallel with the line previously made. During this operation of the machine the tooth carried by the standard on the center bar $b$ will have the form of the marker-tooth $l'$. (Shown in Fig. 5.)

By removing the thumb-screw $j$ from the center bar $b$ the standard and tooth carried by said bar may be entirely inverted and swung up out of the operative position, and the remaining teeth on the side bars $a$ will serve to turn the earth over toward the center and cover the row.

By removing the right-hand outside tooth and substituting the plowshare $l^2$ (shown in Fig. 4) and then elevating all of the other teeth, as has heretofore been described, the device will become converted into a hiller, and by lowering the central standard and its tooth thereon and elevating all the other standards and teeth the device will become converted into a plow.

A wheel $m$ is mounted on a shaft $p$ at the forward converging ends of the side bars, and an arm $q$ extends upwardly from said shaft and is provided at its end with a hook $o$.

A traction-bar $r$ is provided at one end with an eye $r'$, and at its opposite end said bar is provided with laterally-projecting arms $r^2$, which extend in a direction crosswise of the bars $a$ and $b$ and project through a hole $r^3$ in the upper end of the brace-bars $a'$. By this construction and arrangement of traction-bar the arm $q$ is held in the vertical position and the machine is stiffened in a lengthwise direction.

Having thus fully described my invention, what I claim as new, and desire to secure by Letters Patent, is—

1. In a device of the class described the combination with the side bars; of a center bar interposed between the said side bars; a brace-bar extending vertically from each of said side bars; an arm projecting above the forward end of said side bars; a bar connecting said arm with the side brace-bars; one or more standards pivotally mounted on said side and center bars, and a tooth carried by each of said standards.

2. In a device of the class described the combination with the diverging side bars; of a center bar interposed between said side bars; a wheel mounted at the converging ends of said side bars; an arm at said converging end and projecting above said wheel; brace-bars extending vertically from said side bars and provided near their upper ends with openings, $r^3$; a traction-bar connected at one end to said arm and at its other end having laterally-projecting cross-arms which take in the openings of the brace-bars; one or more standards pivotally mounted on said side and center bars and a tooth carried by each of said standards, for the purpose set forth.

In testimony whereof I have signed my name to this specification in the presence of two subscribing witnesses.

THOMAS F. SMITHSON.

Witnesses:
   E. H. BULL,
   W. G. McFADDEN.